US008397771B2

(12) United States Patent
Bormann

(10) Patent No.: US 8,397,771 B2
(45) Date of Patent: Mar. 19, 2013

(54) AUTO-BALANCING TIRE

(75) Inventor: René Bormann, Moesdorf (LU)

(73) Assignee: The Goodyear Tire & Rubber Company, Akron, OH (US)

(*) Notice: Subject to any disclaimer, the term of this patent is extended or adjusted under 35 U.S.C. 154(b) by 239 days.

(21) Appl. No.: 12/908,023

(22) Filed: Oct. 20, 2010

(65) Prior Publication Data
US 2012/0097299 A1    Apr. 26, 2012

(51) Int. Cl.
B60C 15/00    (2006.01)
B60C 15/04    (2006.01)

(52) U.S. Cl. .................. 152/154.1; 152/539; 152/540

(58) Field of Classification Search ............ 152/154.1, 152/540, 331.1, 336.1, 339.1; B60C 19/00, B60C 9/18, 15/00, 5/00, 19/12, 15/04
See application file for complete search history.

(56) References Cited

U.S. PATENT DOCUMENTS

| | | | |
|---|---|---|---|
| 2,695,047 A | 11/1954 | Ruck | |
| 4,825,924 A * | 5/1989 | Frerichs et al. | 152/540 |
| 4,867,792 A | 9/1989 | Ronlan | 106/189 |
| 5,253,928 A | 10/1993 | Patti | 301/5.22 |
| 5,271,664 A | 12/1993 | Fujita et al. | 301/5.22 |
| 5,431,726 A | 7/1995 | Ronlan | 106/266 |
| 5,466,049 A | 11/1995 | Harmsen | 301/5.22 |
| 5,540,767 A | 7/1996 | Ronlan | 106/287.35 |
| 5,766,501 A | 6/1998 | Heffernan et al. | 252/1 |
| 6,129,797 A | 10/2000 | Heffernan et al. | 156/75 |
| 6,295,678 B1 | 10/2001 | Jonsson et al. | 8/159 |
| 6,578,225 B2 | 6/2003 | Jonsson | 8/159 |
| 6,668,635 B2 | 12/2003 | Kunsch et al. | 73/146 |
| 6,740,280 B1 | 5/2004 | Brown et al. | 264/326 |
| 6,974,362 B2 | 12/2005 | Lindell et al. | 451/5 |
| 7,192,096 B2 * | 3/2007 | Fogal et al. | 301/5.22 |
| 2003/0155055 A1 | 8/2003 | Leblanc | 152/154.1 |
| 2005/0159534 A1 | 7/2005 | Ronlan | 524/494 |
| 2006/0001309 A1 | 1/2006 | Krueger | 301/5.21 |
| 2006/0226696 A1 | 10/2006 | Jones | 301/5.22 |
| 2007/0000322 A1 | 1/2007 | Gessler, Jr. | 73/460 |
| 2007/0126278 A1 | 6/2007 | Baek | 301/5.21 |
| 2007/0126279 A1 | 6/2007 | Fogal, Sr. et al. | 301/5.22 |
| 2007/0227637 A1 | 10/2007 | Cude | 152/154.1 |

FOREIGN PATENT DOCUMENTS

| | | |
|---|---|---|
| DE | 19853691 | 11/1998 |
| EP | 2039536 | 3/2009 |
| JP | 2001071723 A * | 3/2001 |

OTHER PUBLICATIONS

Machine Translation; JP 2001071723A; Ishiyama, Makoto; (No date).*

* cited by examiner

Primary Examiner — Justin Fischer
Assistant Examiner — Kendra Shin
(74) Attorney, Agent, or Firm — Richard B. O'Planick

(57) ABSTRACT

A pneumatic radial tire includes a carcass, opposing bead portions, a carcass reinforcing ply extending between the bead portions, and opposing bead cores situated within respective opposing bead portions. An annular hollow tube member is situated within a bead portion, the tube member containing within a tube internal passageway a viscous fluid and a plurality of spherical balls within the viscous fluid. The spherical balls are dimensioned and sized to freely move circumferentially about the tube passageway. The balancing bodies operationally reposition within the tube passageway to cancel imbalance effects within a running wheel assembly including the tire. The tube member may be located in a tire apex member or form a tire bead core within the tire bead portion with carcass reinforcing ply endings surrounding the tube member.

18 Claims, 9 Drawing Sheets

Tire in Balance

Vehicle at Rest

Tire in Balance

AUTO-BALANCING TIRE

FIELD OF THE INVENTION

The invention relates generally to tire and wheel assemblies and, more particularly, to tire and wheel assemblies having self-balancing capability.

BACKGROUND OF THE INVENTION

Imbalance at the wheel hub is a major contributor to first order vehicle vibrations. Despite efforts to minimize imbalance within tire and wheel assemblies, imbalance remains a problem, particularly imbalance that resurfaces after a tire and wheel assembly has been placed into service.

SUMMARY OF THE INVENTION

In one aspect the invention a pneumatic radial tire includes a carcass, opposing bead portions, a carcass reinforcing ply extending between the bead portions, and opposing bead cores situated within respective opposing bead portions. An annular hollow tube member is situated within a bead portion, the tube member containing within a tube internal passageway a viscous fluid and a plurality of moveable balancing bodies within the viscous fluid. The balancing bodies are dimensioned and sized to freely move about the tube passageway. The balancing bodies operationally reposition within the tube passageway to cancel imbalance effects within a running wheel assembly including the tire.

In another aspect, the moveable balancing bodies are formed as spherical metallic balls filling approximately 10 to 20 percent of the volume of the tube passageway and the viscous fluid an oil composition.

According to a further aspect, the tube member is positioned within a tire apex member radially outward from a bead core. The tube member is composed of a suitable material such as an elastomeric thermoplastic material.

The tube member, in another aspect, forms a tire core within the tire bead portion and the carcass reinforcing ply has ply endings at the tube member. The tube member may as a core be embedded within a layer of bead wires to form a cable.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
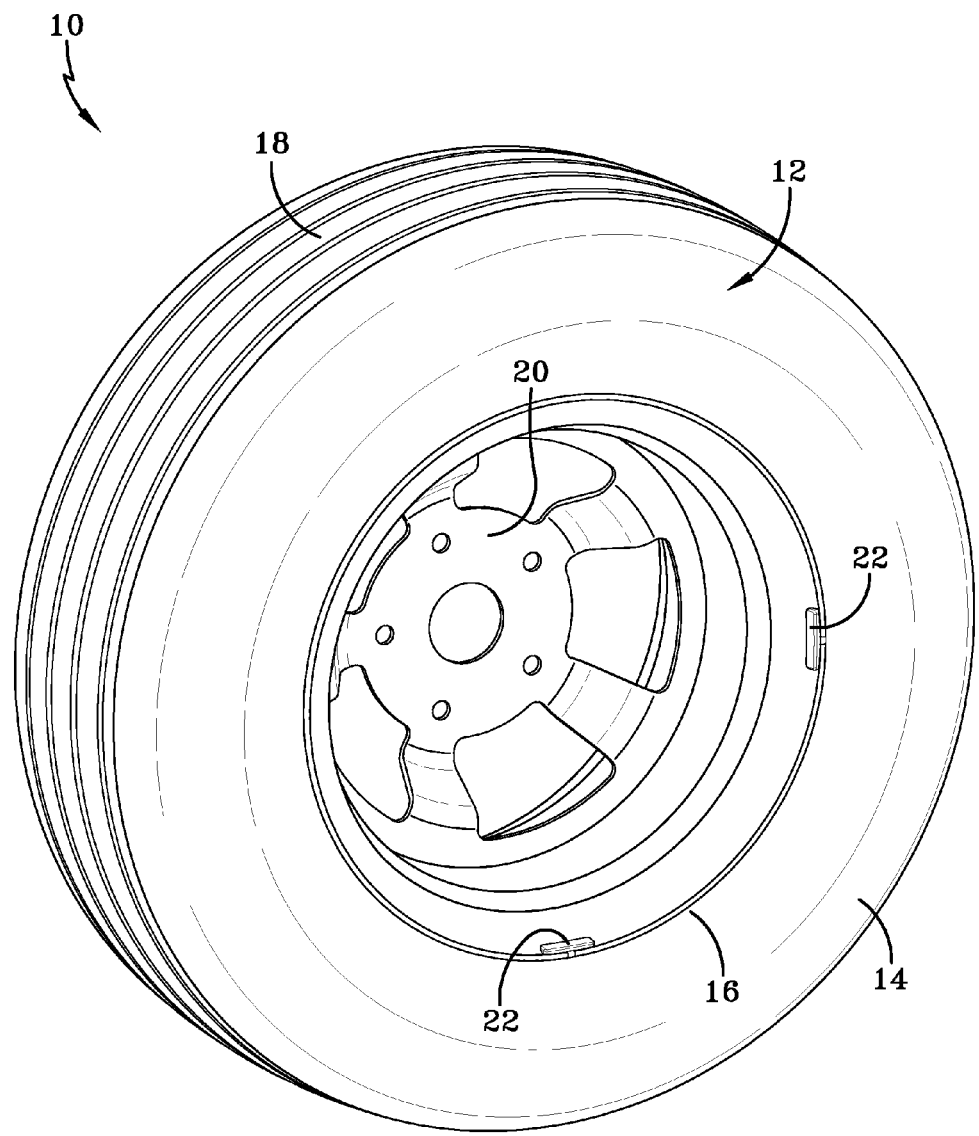
FIG. 1 is a Prior Art assembly showing traditional rim weights.

FIG. 1 shows a Prior Art tire and wheel system in which a conventional tire 10 mounts to a wheel rim 20. The tire carcass 12 is conventionally configured having a pair of sidewalls 14 extending from a pair of opposed bead regions or portions 16 to a tire tread 18. The tire has a pair of tire beads (not shown) that anchor the ply endings of the carcass to the rim in conventional manner. The tire and wheel assembly is balanced by the attachment of one or more weights 22 to the rim 20. The weights 22 are placed in positions to balance the tire and wheel assembly prior to mounting the assembly to a vehicle. Endemic to such a system is the potential for the weights 22 to separate from the wheel from use. The rims are typically painted with nano-structure coatings that may provide insufficient adhesion to the corrective balance weights 22. Also, the balancing of the tire and wheel assembly does not adjust to the potential for contaminant such as mud becoming imbedded to the tire tread during use, causing the balance parameters of the wheel, tire, and contaminant to change.

Figure 2:
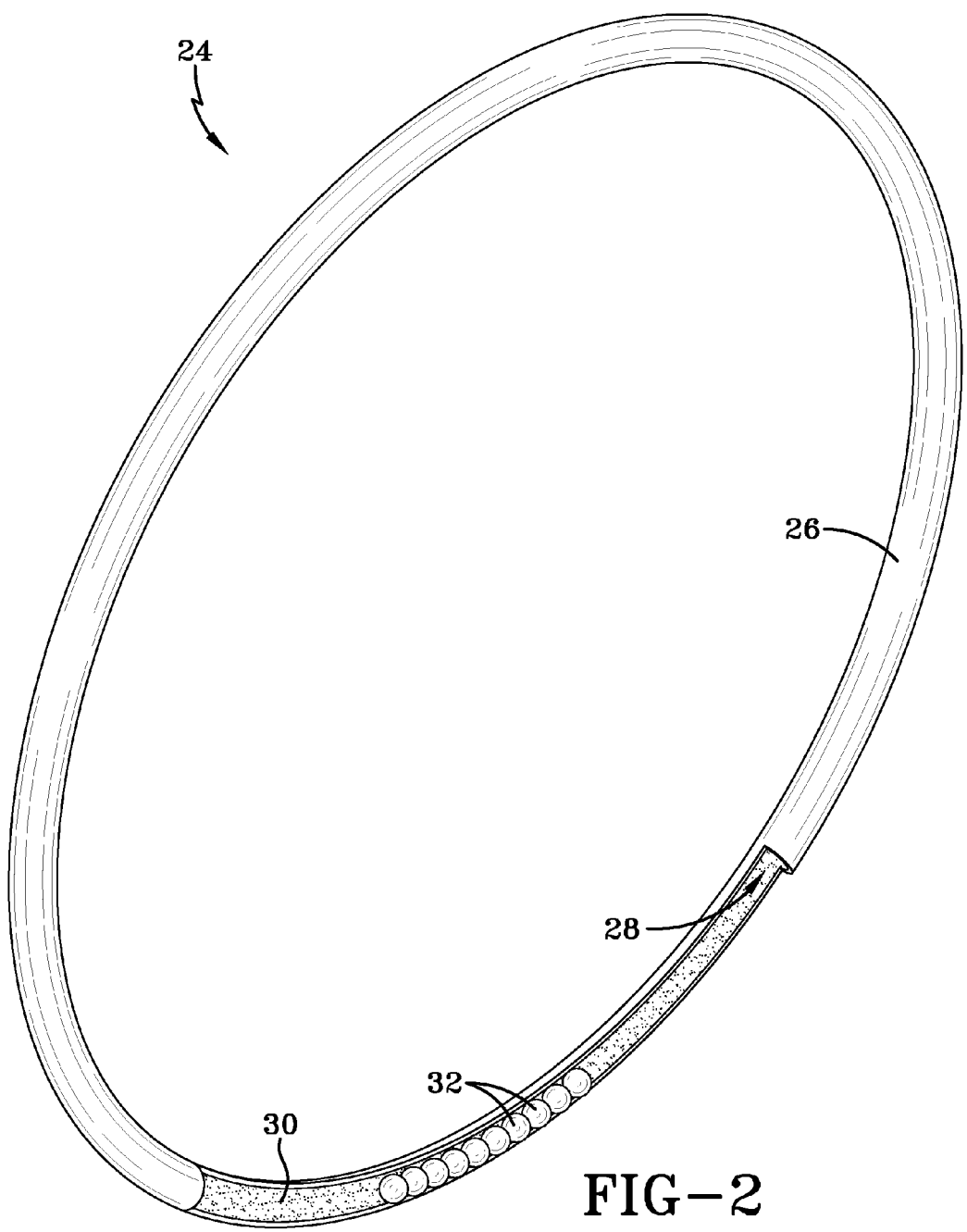
FIG. 2 is an isometric view of an auto-balancing tube with break-away showing balls and fluid.
Figure 3:
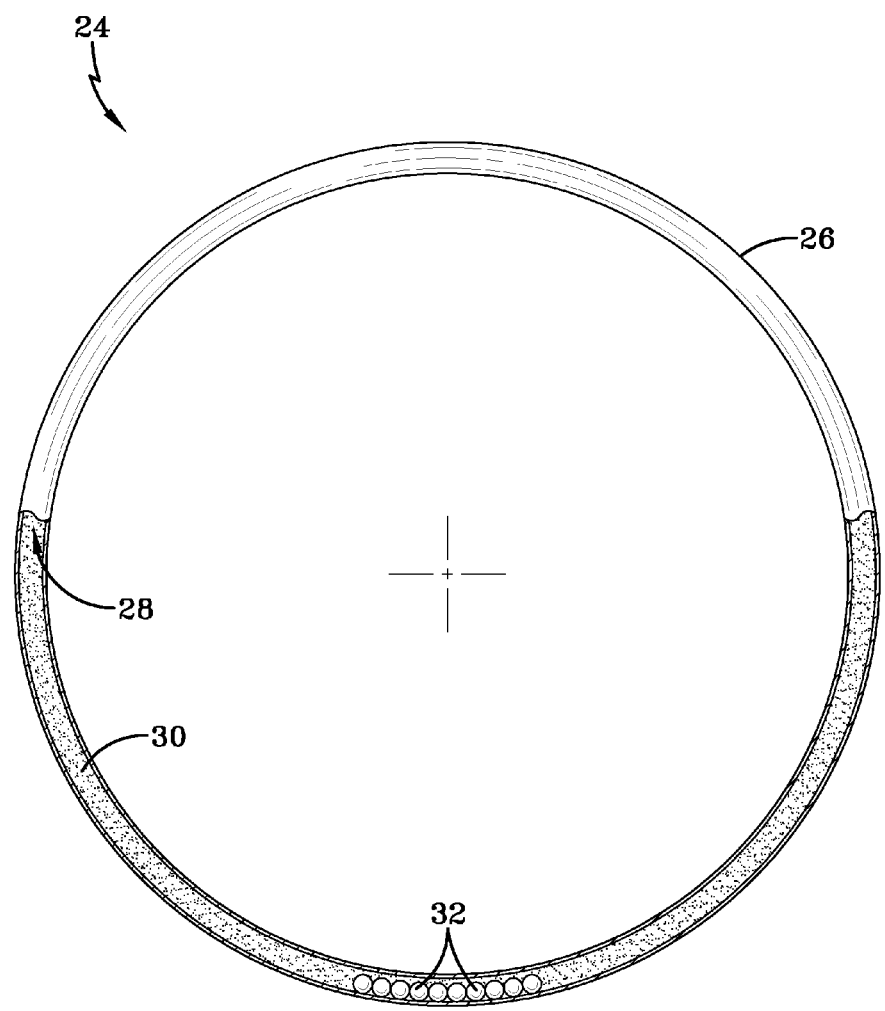
FIG. 3 is a front plan view of the auto-balancing tube with break-away showing balls and fluid, tube is completely filled with fluid.
Figure 5:
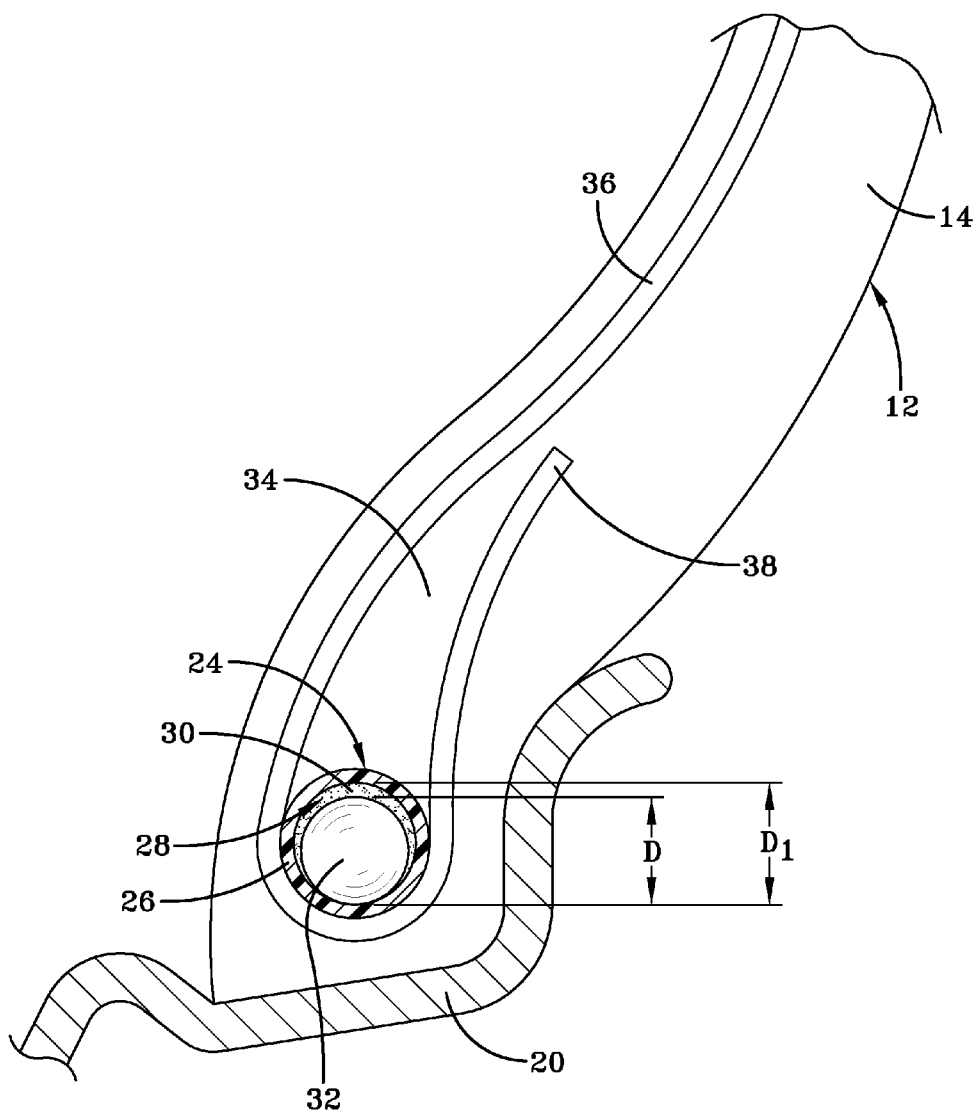
FIG. 5 is an enlarged sectioned view showing hollow bead balancing tube with ball.

The subject invention employs a pair of tube assemblies 24 that mount to bead regions 16 on respective sides of the tire as shown in FIGS. 2 and 3. Each tube assembly 24 is of generally an annular shape having a radius of curvature sufficient to circumscribe the bead region 16 of a respective tire side. The tube assembly includes a tube body 26 formed of a suitably rigid material such as a themoset thermoplastic composition, and includes a central annular tube passageway 28. The tube passageway 28 is filled with a viscous fluid 30 such as an oil composition or mix of suitable viscosity as will be explained. A multitude of spherical balancing bodies 32 in the preferred form of spherical balls are closely received and situated within the fluid 30 inside of the tube passageway 28. The spherical balls 32 as shown in FIG. 5 have a diameter D that closely fits within the passageway 28 having a diameter D1 with clearance sufficient to allow the balls 32 to reposition within the annular body passageway 28. The spherical balls 32 may be formed from a material having suitable mass such steel.

Figure 4:
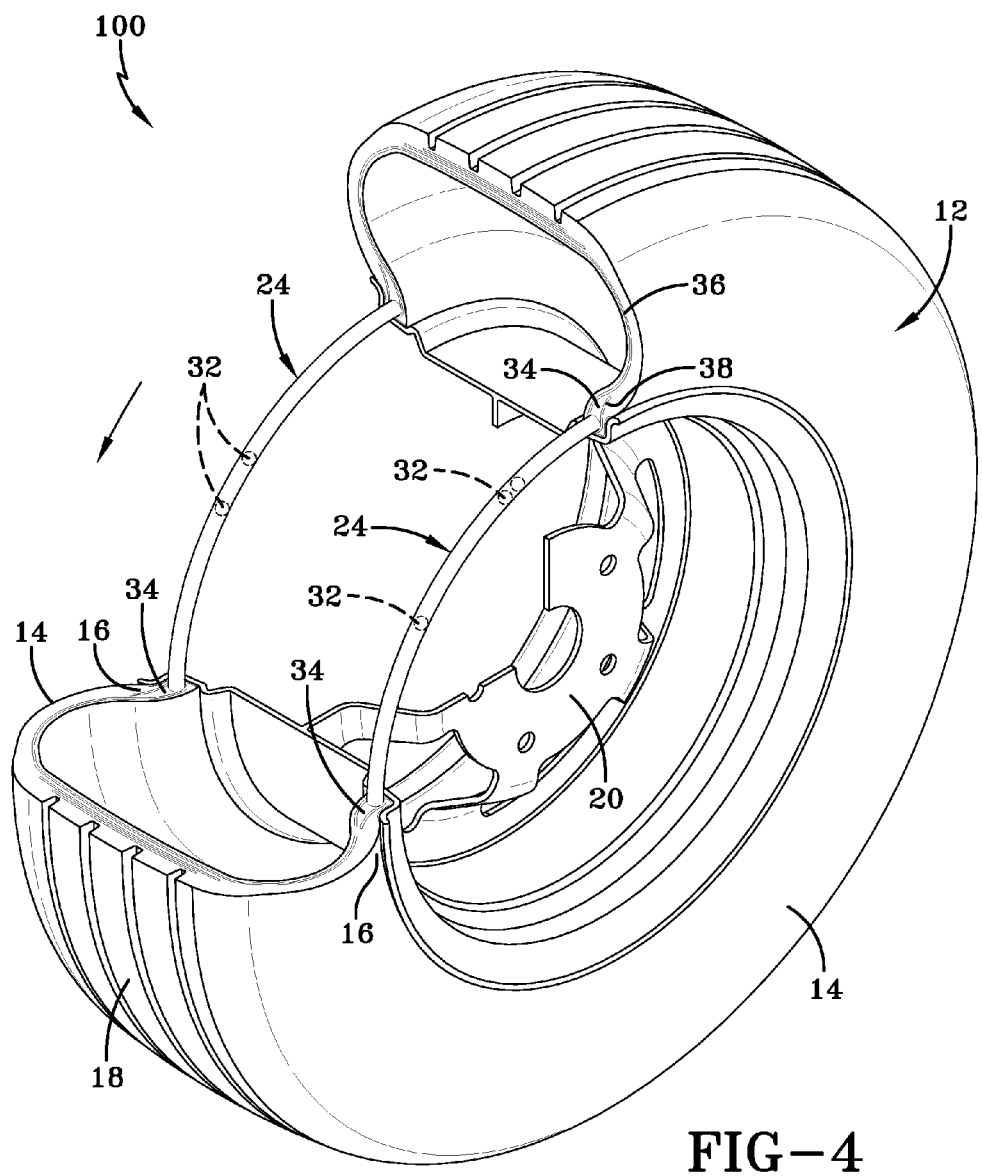
FIG. 4 is an isometric cut-away showing tire/rim and tube locations, tire shown in motion with balls balancing.

FIG. 4 shows a cut-away of a tire and wheel assembly 100, rim 20, and tube body 26 assembly locations with the tire and rim rotating. The spherical balls 32 operationally relocate within the tube body passageway 28 during tire and wheel assembly use to self-balance the tire and wheel assembly 100 and cancel imbalance and radial force variation effects at the vehicle hub level under service conditions. The movement of the spherical balls 32 along passageway 28 thus operates to auto-balance the tire and wheel assembly 100 through a repositioning of the balls 32 during assembly use.

FIG. 5 shows an enlarged section view of he tube 30 functioning in dual capacity as a bead core component as well as a balancing tube containing the balls 32. The tire 12 has one or more reinforcement plies 36 typical to radial tire construction with ply endings 38 extending around a bead core. In the configuration of FIGS. 4 and 5, the tube body 26 functions as a bead core around which ply endings 38 extend. The tube body 26 within bead regions on opposite sides of tire 12 may be composed to function as the bead cores by selection of a suitable material such as brass coated steel or a thermoplastic polymer. Alternatively, (not shown), the tube body 26 may be embedded or sandwiched within a steel wire bead wire layer component that circumscribes the tire bead region with the tube body 26. The tube 26, so reinforced by the layer of traditional steel bead wires, would thus form a cable embodiment with such wires to provide the pair of tire bead cores.

As a further alternative, the tube body 26 may be incorporated within a tire apex component 34 and situated above a conventionally constructed bead core in each tire side. The tube body in an apex-based mounting location would have a material composition compatible with incorporation into an apex 34 such as rubber. The tube assembly 24 would be pre-assembled into the apex component and attached to the tire carcass during a conventional tire build operation.

Figure 6:
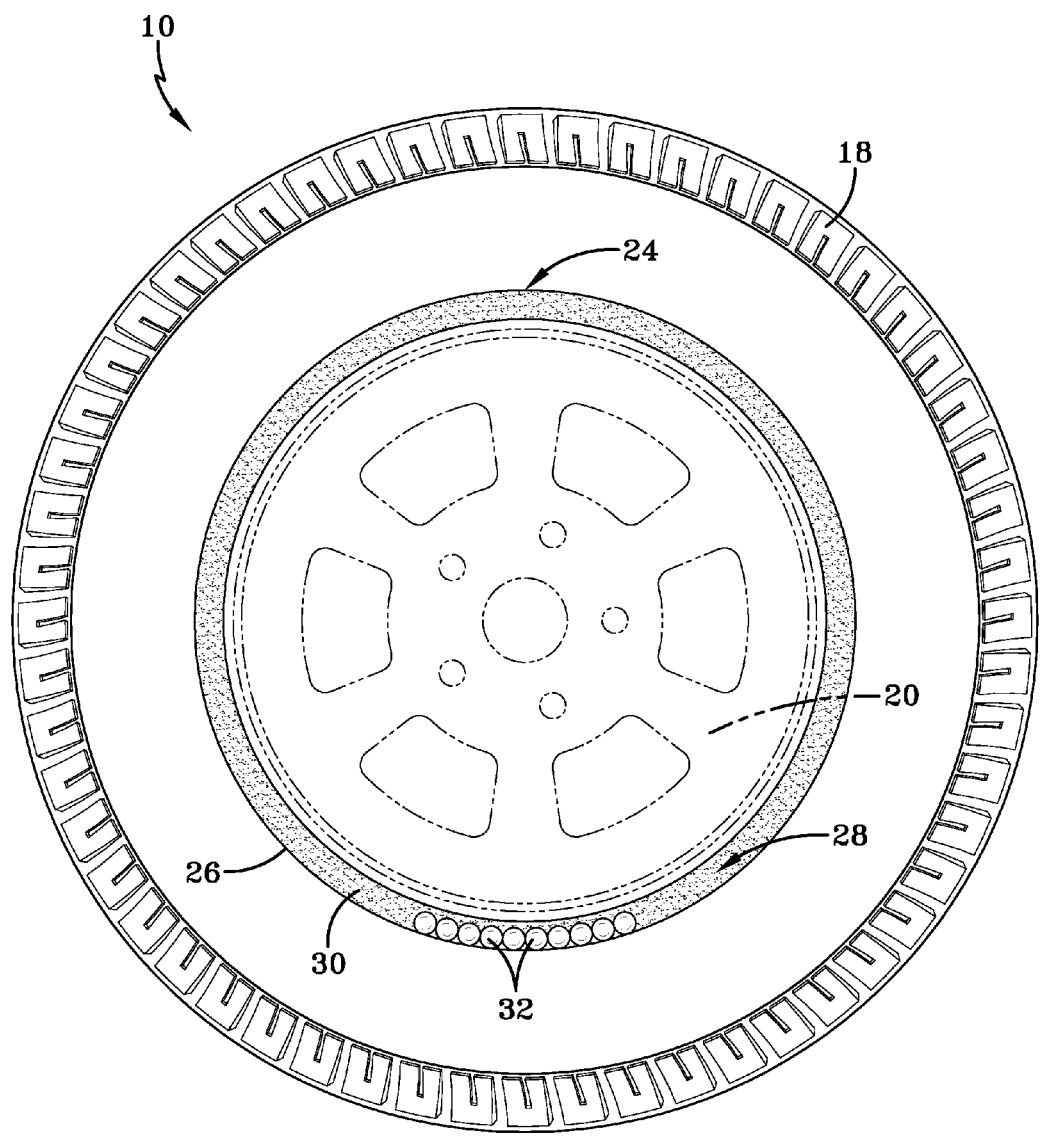
FIG. 6 is a diagrammatic side view of tire showing tube sectioned, view shows tube fully filled with fluid and balls shown in rest position.
Figure 7:
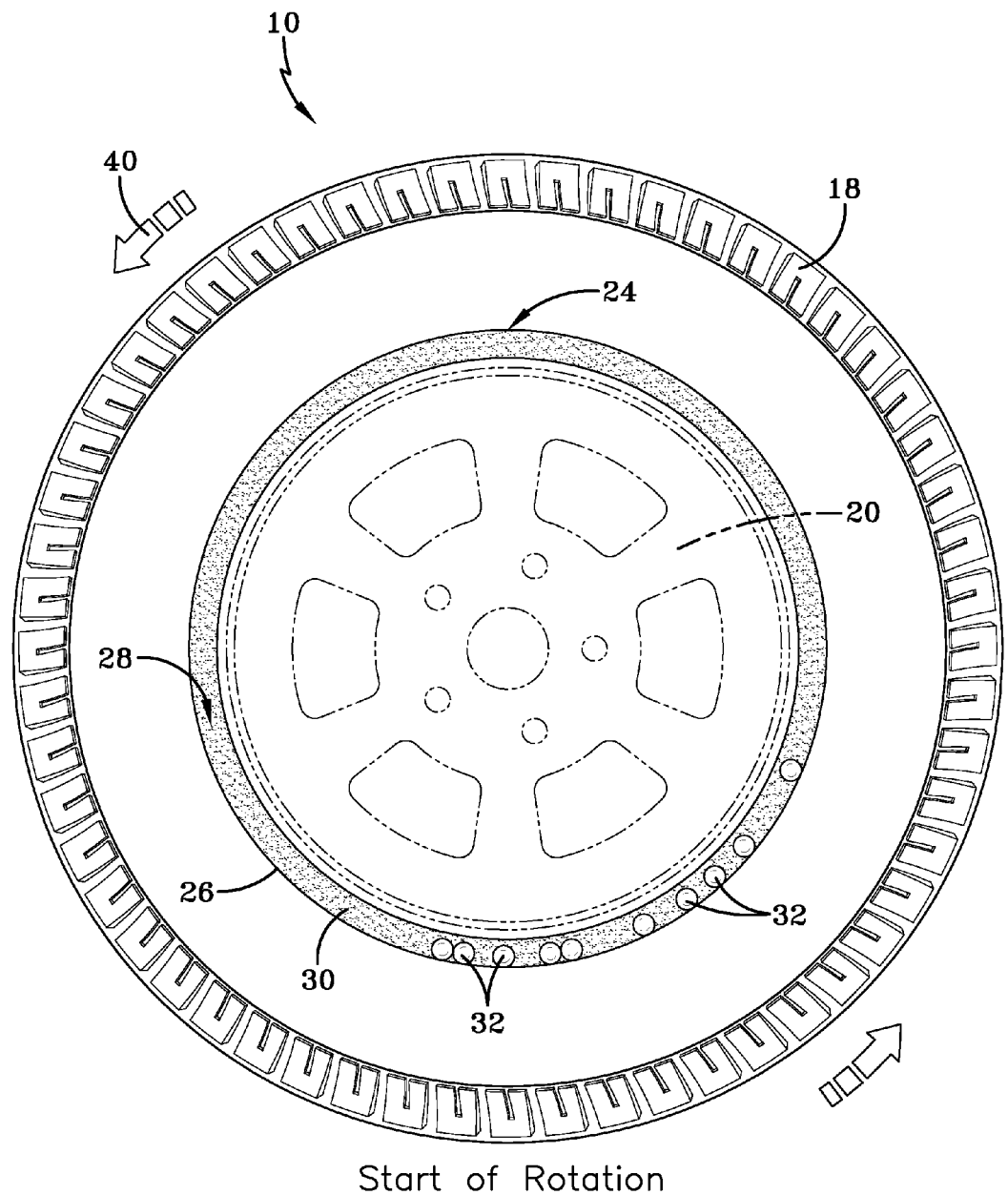
FIG. 7 is a side view of sectioned tube showing balls at start of rotation.
Figure 8:
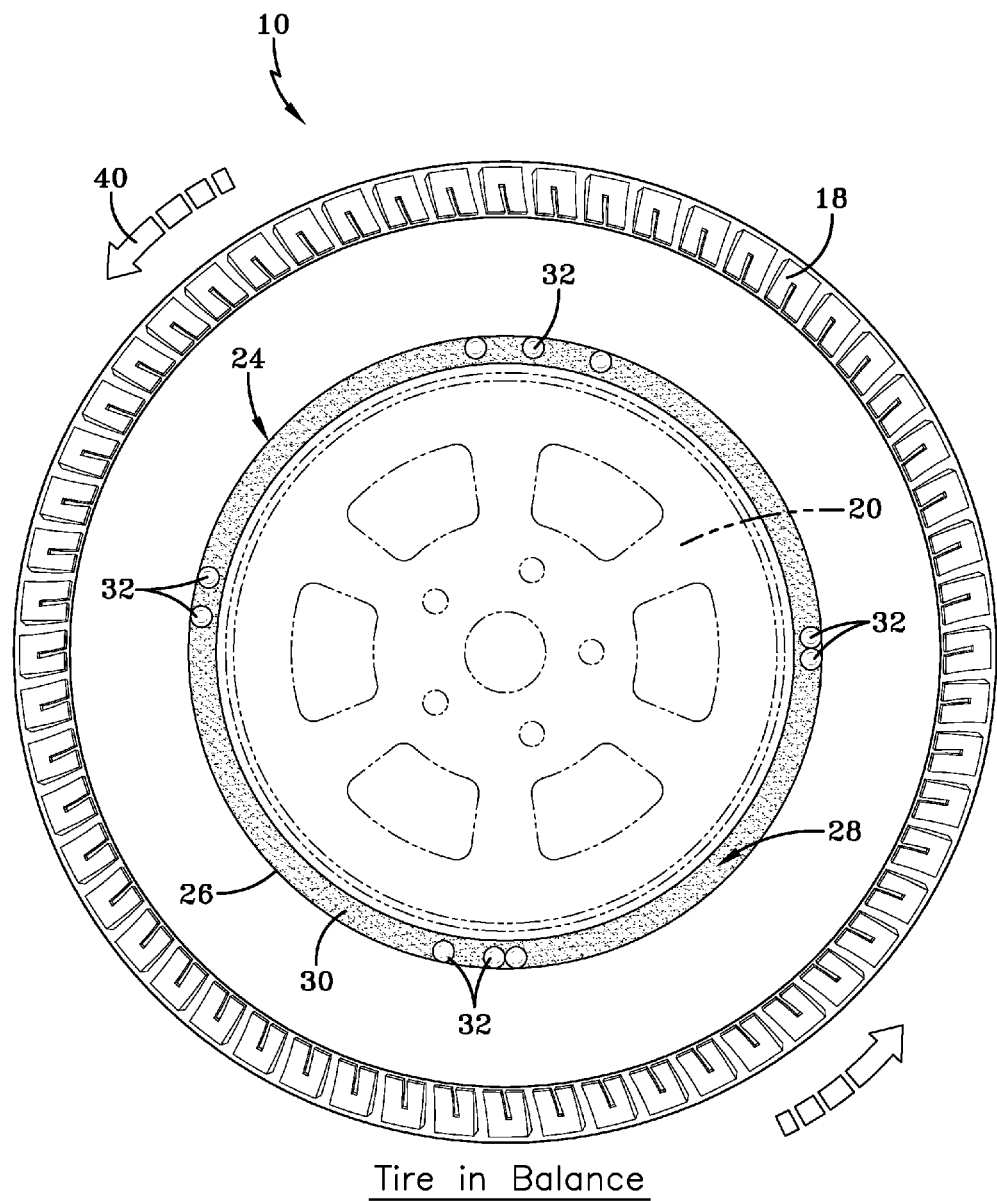
FIG. 8 is a side view of sectioned tube showing balls in balance.

Operation of the auto-balancing tube assembly 24 is illustrated in FIGS. 6, 7, and 8. In FIG. 6, with the tire and wheel assembly at rest, the spherical balls 32 congregate under gravity at the bottom of the tube body passageway 28. The number of spherical balls 32 is generally sufficient to provide sufficient balancing mass. Ten to twenty percent of spherical ball 32 volume to passageway 28 may be used to create the necessary balancing mass of balls 32. As the tire and wheel begin rotation in direction 40 during use, FIG. 7, the spherical balls 32 reposition along the tube passageway 28. The diametric sizing (D) of the balls 32 to inner diameter (D1) of the passageway 28, with appropriate selection of oil viscosity, enable free relocation of the balls 32 within the passageway 28. Once the spherical balls 32 have relocated to locations within the passageway 28 that bring the tire and wheel assembly in balance, as shown in FIG. 8, any assembly imbalance and first order radial force variation resulting from in-service use is canceled. The tire and wheel assembly is thus self-balancing and operates independent of the need for counter-balancing weights used in conventional tire/wheel balancing operation at original equipment manufacturers and tire fitters.

Figure 9:
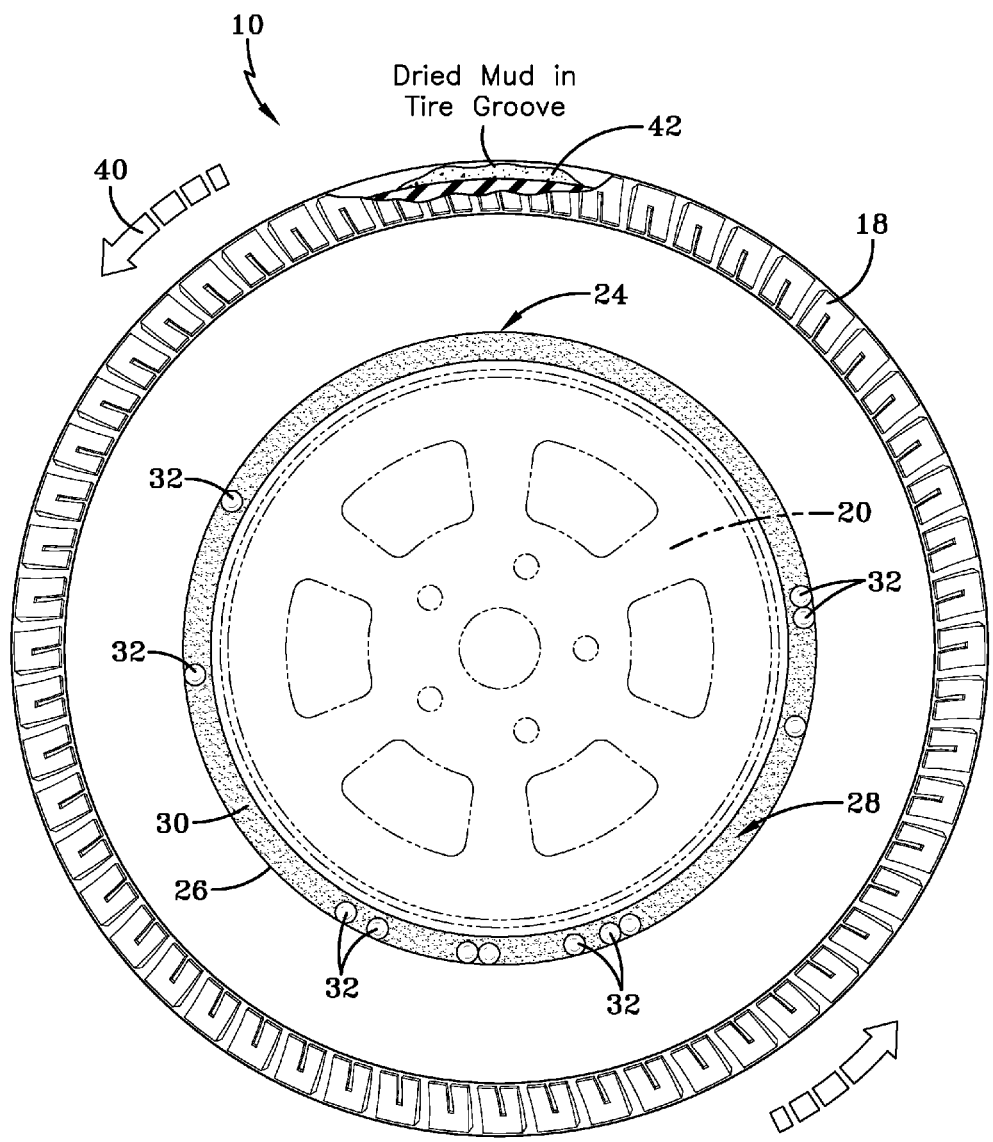
FIG. 9 is a side view of sectioned tube showing balls temporarily re-balancing due to groove contaminant.

FIG. 9 further illustrates the auto-balancing capability of the subject annular tube assemblies 24 when a contaminant such as mud 42 becomes imbedded within the tire tread 18. Adding mass of contaminant 42 to the tread causes a temporary tire and wheel imbalance readjustment condition. The balance of the assembly is automatically re-established when the spherical balls 32 again reposition along the tube passageway 28 to new positions shown. Elimination of the contaminant 42, causing a balance readjustment in the assembly, would likewise be compensated for by a further relocation of the spherical ball mass within the tube passageway.

From the foregoing, it will be appreciated that the subject auto-balancing tube assemblies 24 operate to cancel the combination of assembly imbalance and first order radial force variation under service conditions. Operation of the tube assemblies is automatic and can compensate for the presence of contaminant on the tire tread. While dual tube assemblies 24 are shown preferred in both of the tire bead areas, it will be appreciated that a single tube assembly 24 may be deployed if desired. In addition, it will be appreciated that the auto-balancing tube assemblies 24 may be incorporated function dually as the tire bead cores or be placed within a tire apex component. Material selected for construction of the tube body 26 may be selected to accommodate either embodiment.

Still further, the tube body 26 may be incorporated within and reinforced by a layer of conventional bead core wires if desired.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic radial tire comprising:
    a carcass comprising opposing bead portions, at least one carcass reinforcing ply extending between the bead portions, and opposing bead cores situated within respective opposing bead portions;
    an embedded annular hollow tube member situated within at least one bead portion, the tube member containing within a tube internal passageway a viscous fluid and a plurality of moveable balancing bodies in single file order within the viscous fluid and wherein the balancing bodies are operably diametrically dimensioned to freely move in single file about the tube passageway, the balancing bodies operationally repositioning within the tube passageway to cancel imbalance effects within a running wheel assembly comprising the tire.

2. The tire of claim 1 wherein the moveable balancing bodies comprise spherical metallic balls.

3. The tire of claim 2, wherein the viscous fluid at least partially comprises an oil composition.

4. The tire of claim 1, wherein the tube member is positioned within a tire apex member radially outward from a bead core.

5. The tire of claim 1, wherein the tube member is composed of an elastomeric thermoplastic material.

6. The tire of claim 1, wherein the balancing bodies comprise 10 to 20 percent of the volume of the tube passageway.

7. The tire of claim 6, wherein the moveable bodies comprise spherical metallic balls.

8. The tire of claim 1, wherein the repositioning of the balancing bodies within the tube passageway operationally cancels at least partially a combination of tire and wheel assembly imbalance and first order Radial Force Variation under service conditions.

9. The tire of claim 1, wherein each balancing body forms a sphere having a diametric dimension closely received within the tube passageway.

10. The tire of claim 1, wherein comprising first and second annular tube members embedded within opposing bead portion of the tire.

11. The tire of claim 10, wherein first and second pluralities of the moveable balancing bodies are closely received within the first and the second annular tube members, respectively, in single file order.

12. The tire of claim 11, where each balancing body is spherical having a diametric dimension closely received within a respective tube passageway.

13. A pneumatic radial tire comprising:
    a carcass comprising opposing bead portions, at least one carcass reinforcing ply extending between the bead portions, and opposing bead cores situated within respective opposing bead portions;
    an embedded annular hollow tube member situated within at least one bead portion, the tube member containing within a tube internal passageway a viscous fluid and a plurality of moveable balancing bodies in single file order within the viscous fluid and wherein the balancing bodies are operably diametrically dimensioned to freely move in single file about the tube passageway, the balancing bodies operationally repositioning within the tube passageway to cancel imbalance effects within a running wheel assembly comprising the tire; and
    wherein the tube member operably functions as a bead core within the at least one bead portion, and the carcass reinforcing ply having ply endings at least partially surrounding the tube member.

14. The tire of claim 13, wherein the tube member is at least partially composed from the group of materials: metal, thermoplastic polymer.

15. The tire of claim 14, wherein the tube member is at least partially embedded within at least one layer of bead wires to form a cable.

16. The tire of claim 14, wherein the balancing bodies comprise spherical metallic balls.

17. The tire of claim 16, wherein the viscous fluid at least partially comprises an oil composition.

18. The tire of claim 16, wherein the spherical metallic balls comprise 10 to 20 percent of the volume of the tube passageway.

* * * * *